INVENTOR
HENRY H. WHEELER
BY *Joseph Shea*
ATTORNEY

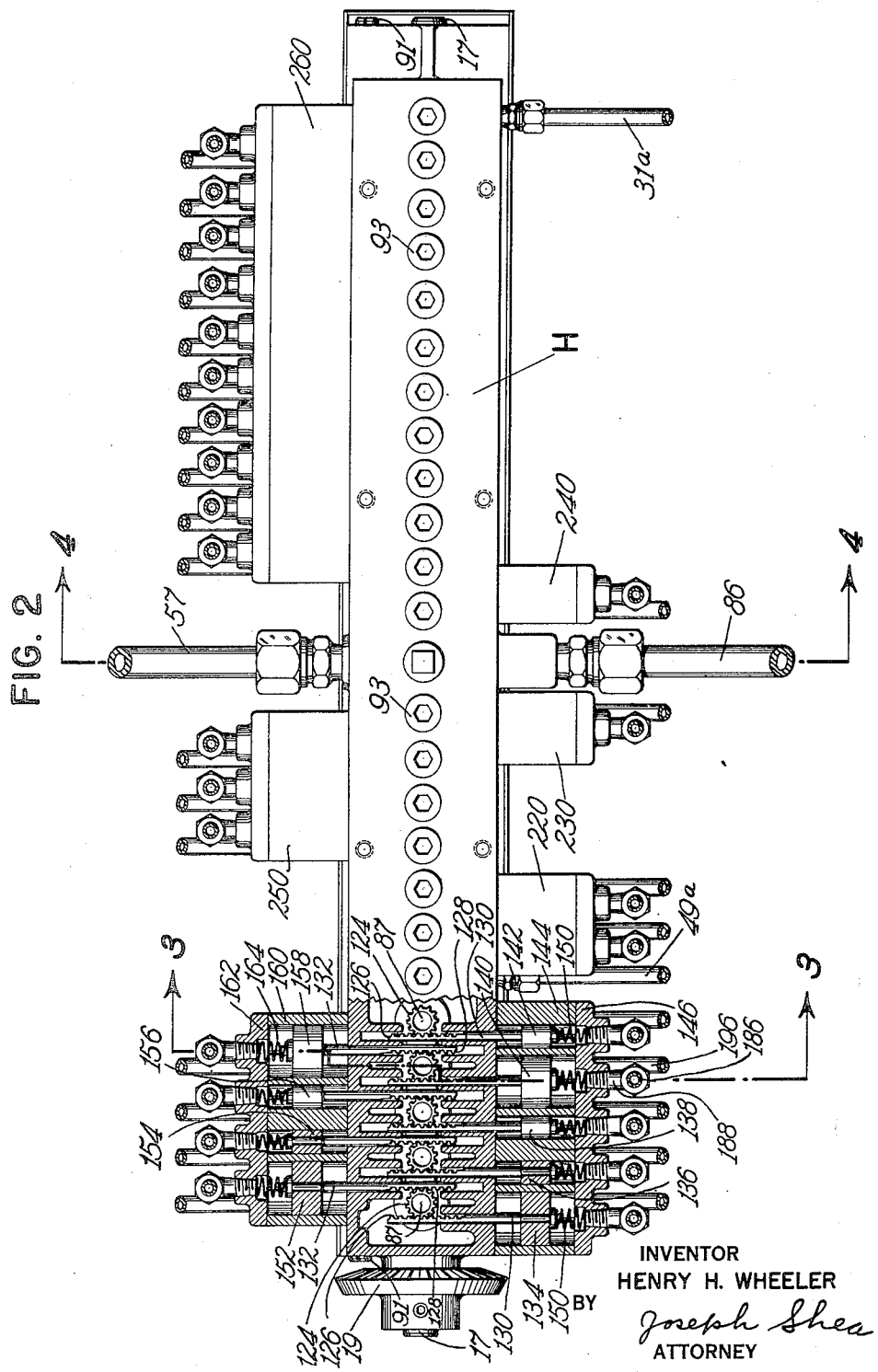

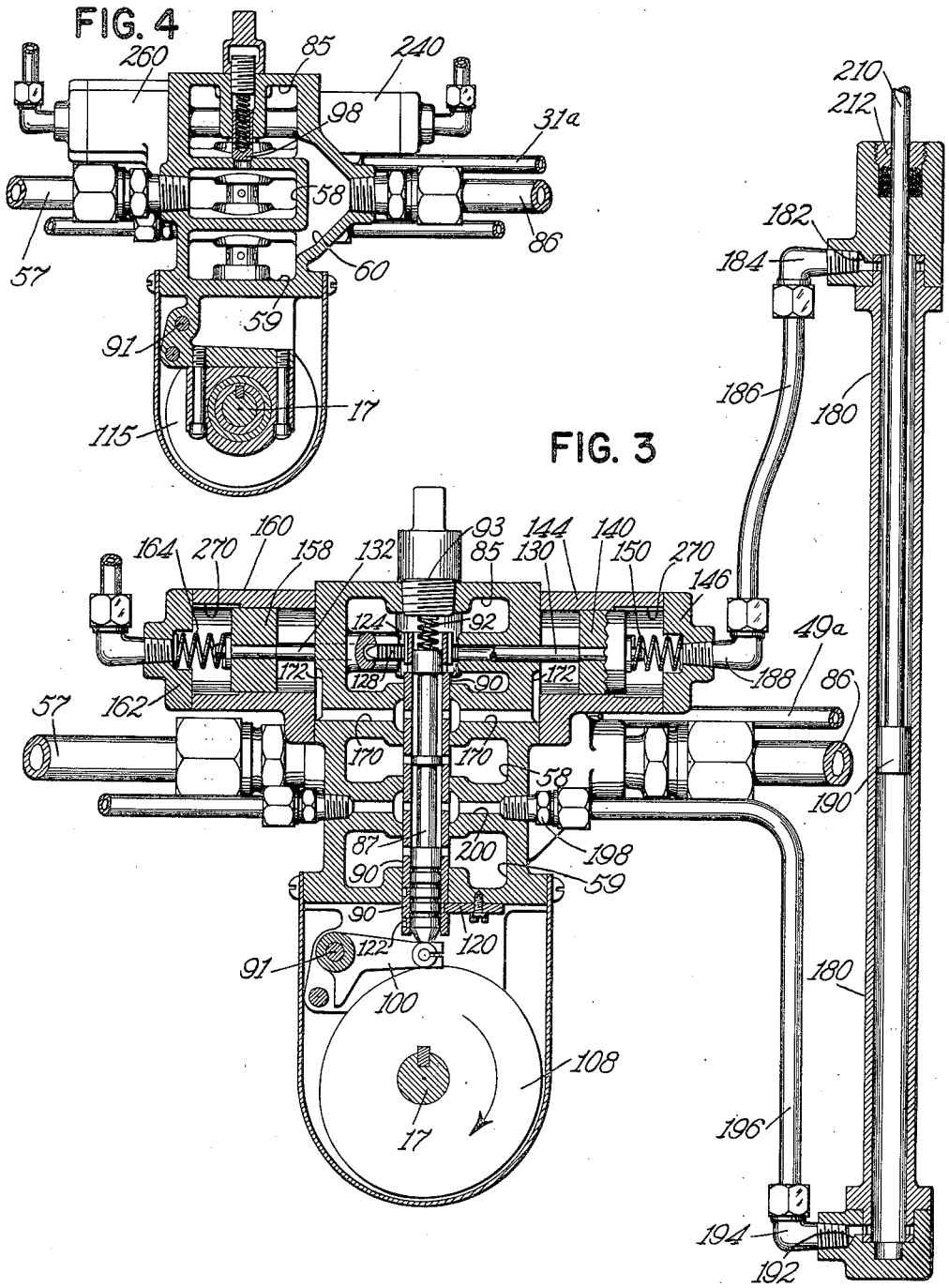

Patented Jan. 26, 1954

2,667,146

UNITED STATES PATENT OFFICE 2,667,146

FOLLOW-UP PRESSURE FLUID SERVOMOTOR

Henry H. Wheeler, Bellerose, N. Y., assignor to International Cigar Machinery Company, a corporation of New Jersey Application January 27, 1948, Serial No. 4,616

6 Claims. (Cl. 121—41)

This invention relates to servo-mechanisms, more particularly to hydraulically operated servo-control systems which may be used for various purposes.

One of the main objects of the invention is to provide a hydraulically operated servo-control system provided with suitable motivating means whereby one or more hydraulic motors will be operated in a predetermined timed relationship to the motivating means. Heretofore, in hydraulically operated machines of the type shown in my co-pending application, Serial No. 712,456 the timed relationship of the various parts thereof might be disturbed if the machine were stopped between cycles or there was manual interference with any of the parts operated by the hydraulic motors. With my servo-control system the various parts operated from the hydraulic motors will maintain their predetermined timed relationship.

A further object of the invention is to control the speed at which the parts operated by the hydraulic motors are displaced. Hitherto the speed at which the hydraulic motors displaced the parts operated therefrom was controlled by throttling separate from the main valve. In my servo-control system, cams or other suitable motivating means operating the master valves will control the speed of the motors. For this purpose valve sleeves enclosing the master valves and movable therewith, stop the flow of fluid through the respective valve sleeves whenever any one of the valves stops moving. Thus fluid is delivered under pressure to cylinders wherein metering pistons are displaced to operate the motors in properly timed relationship to the cams or other suitable motivating means employed. Moreover, by varying the size and stroke of the metering pistons it is possible to obtain the various displacements of the motors required for operating different parts.

A still further object is to provide a construction of the valves and motors, which should they be displaced, will return the same to proper timed relationship immediately after the obstruction is removed.

With these and other objects not specifically mentioned in view, the invention consists in certain constructions and combinations which will be hereinafter described.

In the accompanying drawings, which form a part of this specification and in which like characters of reference indicate the same or like parts:

Fig. 2 is a plan view of the same, a portion of the valve housing being broken away to expose certain of the master valves;

Fig. 3 is a cross-section of the same illustrating one of the master valves and the servo-control associated therewith; and Fig. 4 is a cross-section of the same taken on the line 4—4 of Fig. 2.

Figure 1:
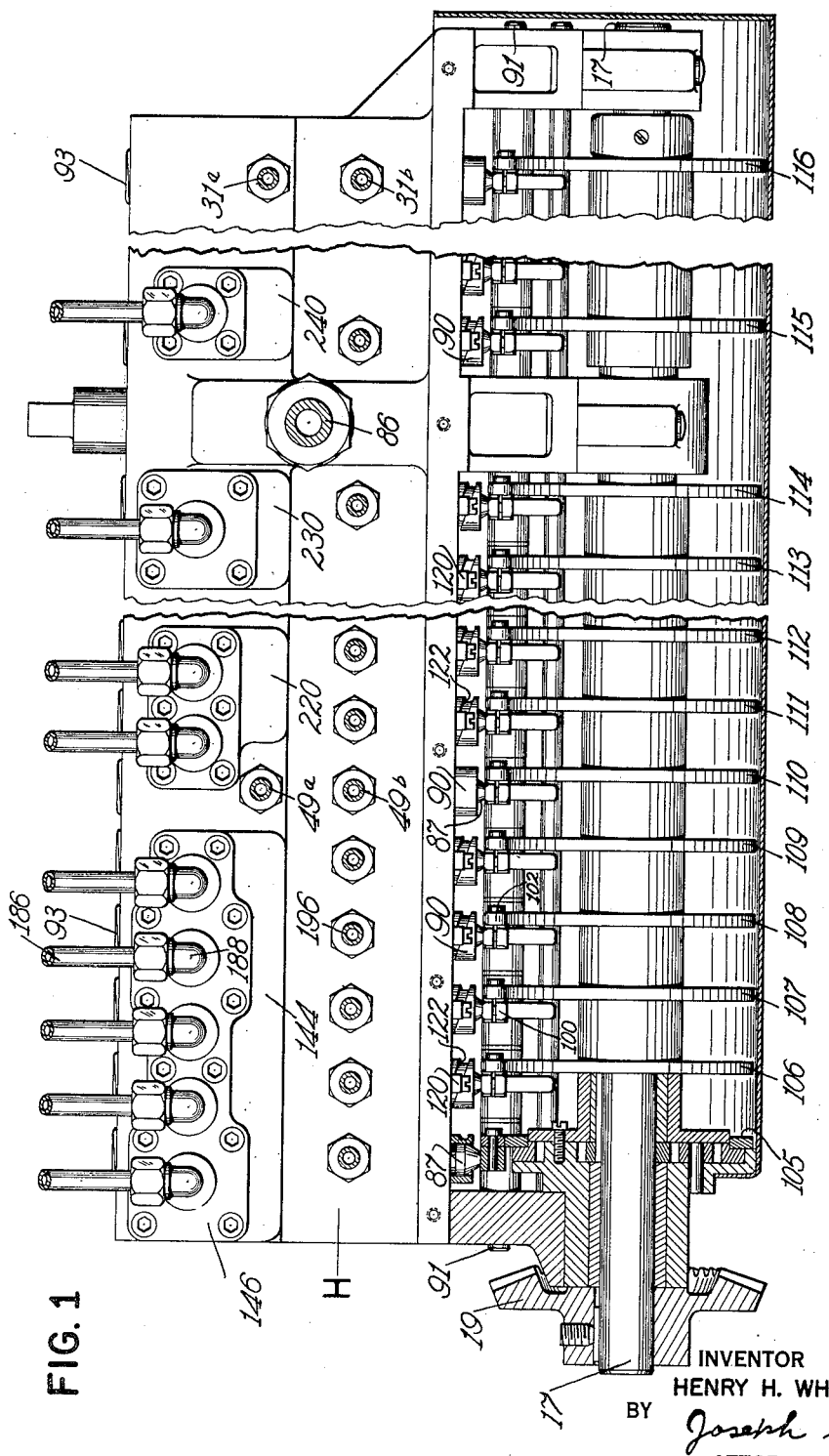
Fig. 1 is a side elevation of a master valve housing enclosing a series of master valves which are associated with servo-controls embodying my invention, a portion of the valve housing being cut away to expose the cam shaft and the cams thereon.

Referring to Figs. 1, 2 and 4 of the drawings it may be noted that the valve housing H is connected by a pipe 57 to a pump (not shown) of any suitable construction such as shown in my co-pending application, Serial No. 712,456, filed November 29, 1946. The oil is delivered under pressure through pipe 57 to a cored out chamber 58 in the valve housing H whereby a supply of oil is maintained therein under pressure. Chamber 58 extends over the entire length of the valve housing H and feeds oil under pressure to each of a series of master valves 87 (Figs. 1 and 3) which will be hereinafter described. A pair of cored out chambers 59 and 85, which also extend the full length of the valve housing H, communicate with each other through a port 60 as shown in Fig. 4. The chambers 59 and 85 receive the exhausted oil from each of the master valves in a manner which will be hereinafter described and return it to the pump (not shown) through a pipe 86 connected to the port 60 (Fig. 4). A relief valve 98 of conventional construction allows oil to escape from the pressure chamber 58 into the exhaust chamber 85 whenever the oil pressure in chamber 58 becomes excessive. The oil pressure in chamber 58 is thereby maintained below a predetermined maximum pressure.

Each of the master valves 87 is of well known construction and has head sections of increased diameter at its central portion and on its ends. There may be any suitable number of valves 87 depending upon the number of mechanisms to be operated. Each of the valves 87 is slidably mounted in a sleeve 90 revolubly mounted in housing H. Each valve sleeve 90 is provided with five sets of aligned holes which are so spaced along the sleeve that the three sets of holes which communicate with the chambers 58, 59 and 85 are normally closed by the head sections on valves 87. The lower ends of valves 87 rest on cam levers 100 which are fulcrummed on a shaft 91 supported by the valve housing H and carry cam rollers 102. Springs 92, which are seated in sockets in the upper end of each valve 87 and engage plugs 93 threaded into the top of the valve housing, maintain the cam rollers 102 on cam levers 100 in engagement with a series of cams mounted on the cam shaft 17.

In the particular embodiment of the invention shown herein, which is designed for use in connection with the cigar machine forming the subject matter of my co-pending application referred to above, there are twenty-four valves 87 and twenty-four cams on shaft 17 for operating said valves. However, the number of valves and cams may be varied as required for the particular installation to which my invention may be applied. It will be noted, however, that because certain sections of valve housing H are broken away in Fig. 1, only the cams 105-116 are illustrated in conjunction with their corresponding valves 87 for explaining the illustrated embodiment of the invention. Since the construction of these cams, and the manner in which they are mounted on cam shaft 17 is fully described in said co-pending application, further description thereof is omitted in the interest of brevity. It may be noted however that cam shaft 17 is provided with a bevel gear 19 through which the shaft 17 is driven in timed relationship to the various mechanisms to be operated.

Each of the valves 87 is slidably mounted in a sleeve 90 and is operated by its corresponding cam. The sleeves 90, however, are rotated by the oil actuating pistons through racks 126 and 128 hereinafter described, whenever the valves 87 move up or down. A tongue 120 (Fig. 1) secured to housing H engages a spiral groove 122 formed in the lower ends of each of the sleeves 90 and thereby causes the sleeve to move up or down depending upon the direction in which it is turned. This up or down movement of each sleeve 90 corresponds to the up or down movement of valve 87 enclosed therein and is stopped whenever valve 87 stops moving. For this purpose the throw of the cam operating the particular valve is made to correspond to the vertical displacement of the sleeve 90 so produced.

On the upper ends of the sleeves 90 of each of the valves 87 operated by the cams 105-109 inclusive are secured pinions 124. Each of these pinions 124 meshes with a pair of racks 126 and 128 formed on pairs of piston rods 130 and 132, except the pinion 124 on the sleeve of the valve operated by cam 109 which meshes with only one rack 126. The piston rods 130 are connected to pistons 134, 136, 138, 140 and 142, respectively. Each of these pistons is slidably mounted in cylinders formed in a block 144 provided with a head 146 and secured to one side of the housing H. A series of compression springs 150 seated in sockets in head 146 maintain the pistons 134, 136, 138, 140 and 142 in a predetermined position unless they are displaced in a manner hereinafter described.

The piston rods 132 are connected to pistons 152, 154, 156 and 158 which are slidably mounted in cylinders formed in a cylinder block 160 fastened to the other side of housing H. The block 160 is provided with a head 162 having sockets in which are seated compression springs 164 engaging pistons 152, 154, 156 and 158. Thus, these pistons are also maintained in a predetermined position until they are displaced in a manner which will be hereinafter described.

When any one of the valves 87 operated by the cams 105-109 is moved downwardly by the operation of its respective cam, the holes normally closed by the central head section of the valve 87 are opened. The oil then flows through the ports 170 and 172 (Fig. 3) into the various cylinders of the blocks 144 and 160. The various pistons in the blocks 144 and 160 are thereby displaced outwardly in their cylinders. This in turn forces the fluid on the opposite side of these pistons through suitable outlets in the heads 146 and 162 into a series of motors. Some of these motors may have a construction similar to that of the actuating cylinder 180 shown in Fig. 3. Therefore description of only the cylinder 180 is deemed sufficient.

The cylinder 180 has an inlet 182 in its upper end in which is threaded a nipple 184 connected by a pipe 186 to a nipple 188 threaded into an outlet provided in head 146 and communicating with the cylinder in which piston 140 is mounted. The oil forced into the upper end of cylinder 180 by piston 140 forces down the piston 190 slidably mounted therein. The oil beneath piston 190 is thus exhausted through an outlet 192 in the bottom of the cylinder 180. A nipple 194 threaded into outlet 192 is connected by a pipe 196 to a nipple 198 threaded into a port 200 communicating with the series of holes in sleeve 90 immediately below the series of holes which are normally closed by the central head section of valve 87 and were opened during the downward movement of the valve. The oil so exhausted from cylinder 180 will flow through pipe 196, the port 200 and the series of holes in sleeve 90 communicating with port 200, into the interior of the sleeve. Since, during the downward movement of valve 87, the lowermost head section of the valve 87 opened the lowermost series of holes in the sleeve 90, the oil will flow from the interior of the sleeve through these holes into the exhaust chamber 59 and eventually be returned through the pipe 86 to the pump (not shown). As the piston 140 is moving whenever oil passes through sleeve 90, its movement and the movement of piston 190 is synchronized with the movement of valve 87. When the movement of valve 87 stops, the flow of oil stops and the movement of pistons 140 and 190 is also stopped.

During the outward displacement of the cylinders in the blocks 144 and 160, racks 126 and 128 coact with pinions 124 to turn the sleeves 90. The rate of displacement of the pistons thus produced is predetermined to permit the sleeves 90 to be lowered by the engagement of tongues 120 with the spiral grooves 122 therein at the same rate at which the valves 87 are lowered by the cams 105-109, inclusive. Whenever any one of the valves 87 operated by these cams stops moving, the motion of pistons in the blocks 144 and 160 and the pistons in the actuating cylinders are also stopped.

This operation is reversed during the upward movement of these valves 87. In the case of the valve operated by cam 108 the oil flows from pressure chamber 58, the port 200 and pipe 196 into the outlet of cylinder 180. The piston 190 is thereby displaced upwardly and the oil is exhausted from the upper end of cylinder 180 into the space behind the piston 140 in its cylinder. The piston 140 is thereby displaced inwardly and the racks 126 and 128 turn the pinion 124 together with sleeve 90 in the opposite direction whereby sleeve 90 is moved upwardly until the motion of valve 87 is stopped by cam 108.

The piston 190 is connected to a piston rod 210 which projects through a suitable stuffing box 212 in the upper end of cylinder 180. The projecting end of piston rod 210 is connected to suitable mechanism (not shown) which will be actuated in a predetermined timed relationship corresponding to the shape of the track of the cam 108. Moreover, the actuating cylinder 180 may be arranged at a considerable distance from the valve 87 controlling the same.

The cylinder blocks 220, 230, 240, 250 and 260 may have the same construction as the cylinder blocks 144 and 160 and be similarly connected to actuating cylinders (not shown) each having a construction similar to that of actuating cylinder 180.

In each of these cylinder blocks is mounted one or more pistons similar to those in blocks 144 and 160. The pistons in blocks 220, 230, 240, 250 and 260 are similarly operated from master valves 87 similar to valves 87 previously described and slidably mounted in revoluble sleeves 90 similar to the sleeves 90 previously described and similarly revolved by racks connected to the pistons in these blocks to cause these sleeves to follow the movement of the valves by engagement of fingers similar to fingers 120 with spiral grooves similar to grooves 122.

In each of the cylinders in the various cylinder blocks mounted on housing H is formed a longitudinal groove 270 extending inwardly from the outer end of each cylinder. The length of grooves 270 is slightly greater than the thickness of the pistons. The purpose of these grooves in the case of the piston 140 and the other pistons is to bypass oil delivered from the pump past the pistons in order to fill the pipe 186 and the upper part of the actuating cylinder 180 at the time of installation of my servo-control mechanism, as well as to replace any oil that may escape from cylinder 180 past the packing in stuffing box 212.

Two of the master valves control the flow of oil through a pair of pipes 49a, 49b and a pair of pipes 31a, 31b, in a manner similar to that described in connection with similarly numbered pipes in my co-pending application referred to above. Therefore, further description of these two master valves and the mechanisms controlled by pipes 49a, 49b and 31a, 31b is deemed unnecessary.

Following is a description of the operation of the servo-mechanism illustrated in Fig. 3. When the valve 87 is lowered by cam 108, fluid under pressure flows through ports 170 and 172 into the metering cylinder and displaces the metering piston 140 outwardly a predetermined distance in this cylinder to deliver a predetermined volume of fluid to actuating cylinder 180. The throw of the cam 108 is predetermined to effect delivery of a predetermined volume of fluid to the metering cylinder during a predetermined portion of one machine cycle. The piston 140 will therefore be displaced a predetermined distance and deliver an equal volume of fluid to the actuating cylinder 180 and thereby displace the piston 190 and piston rod 210 a predetermined distance. When the valve 87 stops moving downward, the sleeve 90 will continue moving downwardly through the coaction of racks 126 and 128 with pinion 124, and finger 122 with spiral groove 120 until the pressure on the inner side of the metering piston 140 is balanced by the pressure on the outer side thereof. Thus the central head section of the valve 87 will almost immediately close the central series of holes in the sleeve and thereby stop further delivery of fluid to the metering cylinder and thereby stop the movement of the piston 190.

The fluid exhausted from the bottom of the actuating cylinder 180 is delivered to the exhaust chamber 59 through the pipe 196 and the port 200 into the series of holes in sleeve 90 intermediate the central series of holes and the lowermost series of holes and thence into the interior of the sleeve. The lowermost and lower intermediate series of holes in sleeve 90 remain open, and thus permit the exhausted oil to flow into the exhaust chamber 59, until the motion of valve 87 stops and the sleeve 90 is moved downwardly to close the holes therein, as previously mentioned. The piston 190 in the cylinder 180 will thereby be locked against manual displacement.

The valve 87 subsequently moves upwardly and the holes in sleeve 90 are opened. The throw of cam 108 is predetermined to effect delivery in a predetermined portion of a machine cycle of a predetermined volume of fluid to the actuating cylinder 180 from the pressure chamber 58 through the central series of holes in sleeve 90 and the lower intermediate series of holes which were thus opened, into the port 200 and thence into the pipe 196 for delivery into the cylinder 180. The piston 190 and piston rod 210 are thus displaced upwardly through a predetermined distance. A predetermined volume of fluid is thereby delivered to the metering cylinder and the metering piston 140 is displaced inwardly, whereby the coaction of racks 126 and 128 with pinion 124 causes the sleeve 90 to follow the upward movement of valve 87. Then, when the valve 87 stops moving upwardly, the sleeve 90 continues moving upwardly until the pressure on the outer face of the metering cylinder is balanced by pressure on the inner face thereof. Therefore the sleeve 90 stops moving upwardly and the holes therein are closed by the head sections of valve 87 almost immediately after the valve 87 stops moving upwardly. The motion of pistons 140 and 190 is thereby terminated and piston 190 is locked against manual displacement.

Moreover, if the motion of piston rod 210 should be obstructed through an interference with the part mechanically connected to and actuated by this rod, the piston rod 210 will be automatically returned to its predetermined timed relationship when the obstruction is removed thus returning the part to proper timed relationship to the rest of the machine.

The reason why the piston rod 210, and the various parts operated therefrom, return to proper timed relationship when the obstruction is removed will now be explained. Until the obstruction is removed the supply of fluid under pressure to the metering cylinder 144 is discontinued, because the displacement of the metering piston 140 is prevented by the obstruction. Therefore, the motion of sleeve 90 will be prevented because the racks 126 and 128 will no longer turn the pinion 124 on sleeve 90, although valve 87 continues its movement. When the obstruction is removed, the displacement of the metering piston 140 will be resumed and the sleeve 90 will also resume its motion.

If the obstruction should be removed before the motion of the piston rod 210 is reversed, the delivery of fluid under pressure to the metering cylinder 144 will be resumed at an increased rate, because the holes in sleeve 90 will have been opened to a greater extent while the valve 87 continued its movement and the motion of sleeve 90 was prevented by the obstruction. Therefore, the metering piston 140 will then be displaced at a rate great enough to cause the sleeve 90 to shut off the supply of fluid under pressure to the metering cylinder 144 almost immediately after the motion of the valve 87 is stopped and before it is reversed. In this manner the predetermined timed relationship of the piston rod 210 and the parts actuated therefrom will be reestablished.

If the obstruction should remain after the motion of the piston rod 210 and valve 87 is reversed, the part actuated from piston rod 210 and whose motion was obstructed, will move away from the obstruction when the motion of piston rod 210 and valve 87 is reversed. This results from the displacement of the metering piston 140 in a direction opposite to that which was prevented by the obstruction, by the fluid delivered to the metering cylinder following the reversal of the motion of valve 87. This reversal of the motion of piston 140 results from the reversal of the motion of valve 87 and does not take place until valve 87 returns to the point at which the obstruction occurred. The timed relationship of the various parts actuated from the metering piston 140, including the sleeve 90, piston rod 210 and the part actuated therefrom, will thus be reestablished. If the obstruction should then be removed this timed relationship will be maintained. If the obstruction is not removed the motion of piston rod 210, the pistons 190 and 140, and the sleeve 90 will again be interrupted when the part actuated from piston rod 210 reengages the obstruction.

As many changes could be made in the above construction, and many apparently widely different embodiments of this invention could be made without departing from the scope of the claims, it is intended that all matters contained in the above description or shown in the accompanying drawings shall be interpreted as illustrative and not in a limiting sense.

What is claimed is:

1. In a servo-mechanism, the combination with a hydraulic motor, a housing provided with a pressure chamber adapted to contain fluid under pressure and a pair of separate exhaust chambers, a hydraulically operated device adapted to supply a predetermined volume of fluid under pressure to said hydraulic motor to operate the same in one direction, said motor having an inlet adapted to receive the fluid from said device and an outlet through which fluid is exhausted when the motor is operated by fluid delivered from said device, mechanism for connecting said device and the outlet of said motor to said pressure chamber and one of said exhaust chambers respectively and then connecting said motor outlet and said fluid operated device to said pressure chamber and the other exhaust chamber respectively whereby said motor will be operated in either direction, said mechanism including a conduit communicating with said hydraulically operated device, a movable valve sleeve having perforations arranged to communicate with said pressure chamber and said conduit and said motor outlet and one of said exhaust chambers, a valve slidably mounted in said sleeve and normally closing the perforations in the sleeve, a cam rotatable in one direction only and having a continuous valve actuating surface for displacing said valve relatively to said sleeve to open the perforations in the sleeve and thereby permit fluid under pressure to flow from said pressure chamber into said device and from said motor outlet into one of the exhaust chambers and thereby operate the motor, and instrumentalities operated by said device for rotating said sleeve, a spiral in said sleeve and a stationary member engaging said spiral to reciprocate the sleeve longitudinally as it rotates to reciprocate with said valve after the perforations of the sleeve have been opened by the valve whereby the valve will close the perforations in said sleeve and thereby stop the motor when the motion of the valve is stopped and said motor will be locked against manual displacement.

2. A servomotor control mechanism for operating a hydraulic motor from a cam surface which rotates in a single direction, said mechanism comprising a valve housing having an inlet port, two exhaust ports, and a pair of ports connected by conduits to said hydraulic motor for moving said motor in opposite directions, a metering piston interposed in one of said conduits for measuring the quantity of oil delivered to or received from said hydraulic motor, a sleeve reciprocably mounted within said valve housing and having separate orifices connecting with each of the ports in said valve housing, a valve piston reciprocably mounted within said sleeve and having spaced collars formed thereon which are adapted to register with the orifices in said sleeve connecting with the inlet and exhaust ports of said valve housing, a cam surface for moving said valve piston relative to said sleeve to allow fluid to pass from said inlet port to one of said conduits to actuate the hydraulic motor, means connecting said metering piston with said sleeve to impart rotary movement to said sleeve proportional to the distance moved by the metering piston, a spiral groove formed externally on said sleeve, a tongue fixed to said valve housing and engaging with the spiral groove in said sleeve to cause rectilinear movement to be imparted to said sleeve when it is rotated so as to bring the sleeve orifices connecting with the inlet and outlet ports into registration with the collars on said valve piston when the metering piston has moved a distance correlated with the movement of the valve piston.

3. A servomotor control mechanism comprising a valve housing having an inlet port for receiving hydraulic fluid under pressure and exhaust ports through which hydraulic fluid is exhausted from the valve housing and a pair of ports connected by means of conduits with the inlet and outlet ports of a hydraulic motor, a sleeve having orifices connecting with each of the ports of said valve housing, a valve plunger reciprocably mounted within said sleeve and having spaced collars formed thereon and adapted to register with the orifices on said sleeve which connect with the exhaust and inlet ports of said valve housing, a spiral groove formed along the outside of said sleeve, a tongue mounted on said valve housing and projecting into said groove to cause the valve sleeve to move rectilinearly when rotated, a metering piston interposed in one of said conduits for measuring the quantity of hydraulic fluid moved into or out of one of the ports of said hydraulic motor, means connecting said metering piston with said sleeve to impart rotary movement to said sleeve correlated with the distance and direction said piston is moved so as to move the sleeve orifices into registration with the corresponding collars on said valve piston, and a cam revolvable in one direction only for moving said valve plunger distances which vary with the contour of said cam surface to thereby cause the hydraulic motor to move distances correlated therewith.

4. In a servo-mechanism, the combination with a source of fluid under pressure, of a hydraulically operated device adapted to deliver a predetermined volume of fluid when operated, and mechanism for connecting said device to said fluid source to operate said device in a predetermined timed relation to said mechanism, said device including a metering cylinder having an inlet in one end thereof adapted to be connected to said source of fluid under pressure by said mechanism and an outlet in the outer end thereof, and a metering piston in said metering cylinder adapted to be displaced by the fluid delivered through the cylinder inlet from said mechanism, and said metering piston controlling the operation of said mechanism whereby although the timed relationship of said device to said mechanism is disturbed by obstruction, it will be resumed after removal of said obstruction, said metering cylinder having a longitudinal slot adjacent its outlet, and the length of said slot, being greater than the breadth of said piston to permit the hydraulic fluid to pass to the other side of the metering piston when the piston approaches the outlet to thereby maintain the outlet side of said metering cylinder filled with fluid at all times.

5. In a servo-mechanism, the combination with a source of fluid under pressure, of a hydraulically operated device adapted to deliver a predetermined volume of fluid when operated, and mechanism for connecting said device to said fluid source to operate said device, said mechanism including a conduit communicating with said hydraulically operated device, a movable valve sleeve having perforations communicating with said conduit and said source of fluid under pressure and adapted when opened to permit fluid to flow from said source through said conduit into said device, a valve slidably mounted in said sleeve and normally closing the perforations in the sleeve, a power driven cam for displacing said valve relatively to said sleeve to open the perforations in the sleeve and thereby permit fluid under pressure to flow into said device and thereby operate the same, and instrumentalities operated by said device for moving said sleeve with said valve while the latter is displaced by said power driven cam whereby the valve will close the perforations in said sleeve and thereby stop the motor when the motion of the valve is stopped, said hydraulically operated device including a cylinder one end of which is connected to said conduit to receive fluid therefrom, the other end of said cylinder being provided with an outlet, a piston in said cylinder adapted to be displaced by fluid delivered to said cylinder from said conduit whereby a predetermined volume of fluid will be delivered through said outlet when said piston is displaced, and a piston rod connected to said piston, and said instrumentalities including a pinion secured to said sleeve, said sleeve having a spiral groove in its lower end, and a stationary member engaging said groove to displace said sleeve longitudinally when it is revolved, and a rack on said piston rod meshing with said pinion to revolve the sleeve when the piston is displaced whereby said sleeve will be displaced longitudinally relative to said valve to effect closure of its perforations when the motion of said valve is stopped, and the operation of said device will thereby be terminated.

6. A servomotor control apparatus, comprising a hydraulic motor adapted to be moved in one or more directions by hydraulic fluid, a valve housing having an inlet port, two exhaust ports, and a pair of ports connected by conduits to said hydraulic motor for moving said motor in one or more directions, a source of supply of hydraulic fluid under pressure connected with said inlet port, a sleeve reciprocably mounted within said valve housing and having separate orifices connected with each of the ports in said valve housing, a valve piston reciprocably mounted within said sleeve and having spaced collars formed thereon which are adapted to register with the orifices in said sleeve which connect with the inlet and exhaust ports of said valve housing, a cam rotatable in one direction only for moving said valve piston relative to said sleeve to permit fluid to pass from said inlet port to one of said conduits to actuate the hydraulic motor in one direction, a spiral groove formed externally on said sleeve, a tongue fixed to said valve housing, and engaging with the spiral groove in said sleeve to impart rectilinear movement to said sleeve when it is rotated so as to bring the sleeve orifices connecting with the inlet and outlet ports into registration with the spaced collars on said valve piston, and means for rotating said sleeve a distance proportional to the distance moved by the hydraulic motor.

HENRY H. WHEELER.

References Cited in the file of this patent

UNITED STATES PATENTS

| Number | Name | Date |
|---|---|---|
| 591,768 | Kaselowsky | Oct. 12, 1897 |
| 1,447,908 | Staude | Mar. 6, 1923 |
| 2,055,530 | Hallenbeck | Sept. 29, 1936 |
| 2,057,088 | DeMillar | Oct. 13, 1936 |
| 2,105,473 | Dean | Jan. 18, 1938 |
| 2,140,037 | Swisher | Dec. 13, 1938 |
| 2,226,821 | Kempson | Dec. 31, 1940 |
| 2,261,444 | Neubert | Nov. 4, 1941 |
| 2,346,857 | Meredith | Apr. 18, 1944 |
| 2,447,090 | Pollock | Aug. 17, 1948 |
| 2,491,551 | Cross | Dec. 20, 1949 |
| 2,494,752 | Gambell | Jan. 17, 1950 |
| 2,511,184 | Walling | June 13, 1950 |